United States Patent Office 3,413,164
Patented Nov. 26, 1968

3,413,164
ARC WELDING FLUX AND METHOD OF
MANUFACTURING THE SAME
Lars Hilding Hillert, Goteborg, Sweden, assignor to Elektriska Svetsningsaktiebolaget, Goteborg, Sweden, a corporation of Sweden
No Drawing. Filed Sept. 7, 1965, Ser. No. 485,586
Claims priority, application Sweden, Sept. 7, 1964, 10,699/64
10 Claims. (Cl. 148—23)

ABSTRACT OF THE DISCLOSURE

A flux for the submerged arc welding of iron and steel is disclosed which consists of granules each of which comprises a plurality of particles of different material agglomerated by a bonding agent consisting exclusively or practically exclusively of boric oxide. The method of making the granular flux comprises mixing powdered flux ingredients with uncombined boric oxide or boric acid, shaping the mixture into compacted bodies having a size not below the required grain size of the flux, subjecting the bodies to a temperature above the fusion point of boric oxide but not exceeding 600° C., cooling the product and, if required, subdividing the bodies into granules, the order of said two last-mentioned steps being arbitrary.

---

This invention relates generally to fluxes or welding powders for the submerged arc welding of iron or steel. The existing fluxes of this kind usually belong to one or the other of two types generally referred to as prefused fluxes and agglomerated fluxes, respectively. In the prefused fluxes, each granule, consists of a fused mixture of the various ingredients. The manufacture of these fluxes is comparatively costly. It is also a disadvantage that metallic alloying or deoxidizing agents required to be present in the flux have to be added as separate grains. In the agglomerated fluxes, each granule comprises a plurality of particles of different materials held together by a bonding agent, usually alkali and metal silicate. The agglomerated powder is comparatively cheap, but the hygroscopicity of the alkali metal silicate renders the flux liable to absorb humidity out of the atmosphere with resultant danger of porosity in the weld metal. To remove this disadvantage, various methods of preparing agglomerated fluxes without the use of alkali metal silicates have already been proposed. According to the British patent specification No. 762,980, the powdered fluxed ingredients are mixed with a powdered, prefused glaze composition, the mixture is heated to a temperature sufficient to cause fusion of the glaze composition, and the resulting mass on cooling is reduced to granule form. The British patent specification No. 846,282 describes similar methods in which powdered flux ingredients are mixed with a powdered binder, for instance a powdered glass, and the mixture is compacted into blocks which are fired at a high temperature, for instance 700 or 800° C., and on cooling are crushed into a powder.

The invention relates to a flux for the submerged arc welding of iron and steel which consists of granules each of which comprises a plurality of particles of different materials agglomerated by a bonding agent, and the invention is principally distinguished thereby that said bonding agent consists exclusively or practically exclusively of boric oxide.

The flux or welding powder according to the invention has several advantages compared to known fluxes. In spite of the fact that the boric oxide in itself has hygroscopic properties, the flux is far less hygroscopic than a flux having an alkali metal silicate binder. The boric oxide is, particularly in its hydrated form (boric acid), cheap and easy to get, in contradistinction to specially manufactured glasses or glazes. The melting point of the boric oxide (450°) is so low that heating of the powder mixture to, for instance, 500° C. is sufficient to result in a satisfactory bonding of the particles. The absence of silica in the binder is also to be considered an advantage in cases when it is desired to prevent an increase of the silicon content of the weld metal by the reduction of silicon out of the slag, or when for other reasons the silica content of the slag has to be kept down to a minimum. The invention also offers the possibility of making an alkali-free flux, or a flux containing a very low proportion of alkali only.

The invention also comprises a particular method of making the new flux, said method comprising the steps of mixing powdered flux ingredients with boric oxide, shaping the mixture into compacted bodies the size of which is at least equal to the required grain size of the flux, subjecting said bodies to a temperature sufficient to melt the boric oxide but not to melt the other ingredients, cooling the product, and, if required, subdividing the bodies into granules, the order of said two last-mentioned steps being arbitrary. The boric oxide supplied to the mixture may be in hydrated form, for instance in the form of boric acid ($H_3BO_3$ or $HBO_2$ or $H_2B_4O_7$) or a mixture of boric acid and boric oxide. The water of the hydrate will be evaporated completely before the temperature of the mixture reaches the melting point of the boric oxide.

The method according to the invention may be carried out in several different ways. For instance, the powder mixture may be moistened with water or a boric acid solution and shaped into grains or granules by any known granulation method, the grains or granules thus obtained being subsequently heated to at least 450° C. According to another possibility, the moistened powder mixture is shaped by pressing or extrusion into blocks or strings, respectively, which are heated to at least 450° C. allowed to cool and subdivided into granules, or which on drying at a temperature below 450° C. are subdivided into granules which are than heated to at least 450° C. in order to develop the bonding action of the boric oxide. In a particularly advantageous method within the invention, the mixture is extruded in the dry state at a temperature of 450 to 600° C., the resulting elongated bodies or strings being subsequently subdivided into granules. Preferably said elongated bodies or strings are given a cross-sectional shape and size such that at least one transversal dimension (the thickness) of said bodies or strings is equal to the required grain size of the flux, whereby the subdivision of said bodies or strings into granules of uniform size is facilitated. Said subdivision may be carried out immediately on extrusion by submitting the still hot and plastic string to the action of a hacking or cutting device. If desired, said devices may be adapted to provide the string with notches or incisions only, in order to facilitate a subsequent subdivision of the strings into discrete granules by means of a suitable breaking device during or after cooling of the extruded strings.

The choice of the proportion of boric oxide to be included in the flux depends on various factors. Proportions below 1% do not yield a satisfactory bond between the particles. Proportions above 10% result in unfavourable properties of the slag and are, therefore, to be avoided. Preferably the proportion should be chosen so as to make the binder ($B_2O_3$) completely fill the interstices between the particles forming the granules. In most cases, a proportion of about 5% of $B_2O_3$, or slightly less, should be sufficient and suitable.

The heating temperature should exceed the melting point 450° C., of the boric oxide sufficiently to cause the boric oxide to enter thoroughly between the said particles of the flux. Generally, heating to about 500° C. is sufficient. It is not necessary to maintain the material a definite period at the high temperature; the material can be allowed to cool directly on attaining the temperature of 500° C. In special cases, for instance when a particularly small proportion of $B_2O_3$ has to be used, a higher temperature, for instance 550° C., and/or the provision of a definite holding period at the high temperature, may be necessary or advantageous. Temperatures exceeding 600° C. are, however, not required and should be avoided.

The following examples are given for the purpose of illustrating the invention.

Example I

The following powdered constituents are mixed in the dry state:

| | Percent |
|---|---|
| Felspar | 22 |
| Rutile | 33.5 |
| Hausmannite | 24 |
| Fluorspar | 8 |
| Silicomanganese (50% Si) | 6 |
| Boric acid ($H_3BO_3$) | 6 |
| Cellulose ester | 0.5 |
| | 100.0 |

The mixture is moistened with water and compressed into a massive cylinder of 20 cm. diameter. The cylinder is dried in air 48 hours at room temperature, heated to 500° C. and extruded into strings of 1 mm. diameter. On emerging from the extrusion press, the strings are immediately cooled with air and subdivided by means of a breaking device into granules having a length varying between 1 mm. and a few millimeters.

Example II

The following powdered constitutents are mixed in the dry state.

| | Percent |
|---|---|
| Calcined bauxite | 33 |
| Rutile | 15.5 |
| Silica flour | 14 |
| Calcined dolomite | 23 |
| Fluorspar | 7.5 |
| Boric acid | 6.5 |
| Cellulose ester | 0.5 |
| | 100.0 |

The mixture is shaped as described in Example I to cylindrical bodies which on being heated to 500° C. are charged into an extrusion press having a slot-shaped die aperture of the dimensions 0.8 x 150 mm. The extruded string or tape is deposited on a steel band conveyor and, when cool, crushed into granules or flakes. The welding flux obtained is suitable for the welding of low-alloy construction steels and also for the welding of high-alloy chromium steels or chromium-nickel steels.

I claim:
1. A flux for the submerged arc welding of iron and steel which consists of granules each of which comprises a plurality of particles of different materials agglomerated by a bonding agent consisting exclusively or practically exclusively of boric oxide.

2. A granular flux as claimed in claim 1 in which the boric oxide substantially completely fills the interstices between the individual particles of the granules.

3. A granular flux as claimed in claim 1 containing 1 to 10 percent by weight of boric oxide.

4. A method of making a granular flux which comprises mixing powdered flux ingredients with uncombined boric oxide, shaping the mixture into compacted bodies having a size at least equal to the required grain size of the flux, subjecting said bodies to a temperature sufficient to melt the boric oxide but not exceeding 600° C., cooling the product, and, if required, subdividing the bodies into granules, the order of said two last-mentioned steps being arbitrary.

5. A method as claimed in claim 4 in which the compacted bodies are subjected to a temperature of 450 to 600° C.

6. A method of making a granular flux which comprises mixing powdered flux ingredients with boric acid, shaping the mixture into compacted bodies having a size at least equal to the required grain size of the flux, subjecting said bodies to a temperature sufficient to remove the water of the boric acid and to melt the remaining boric oxide but not exceeding 600° C., cooling the product, and, if required, subdividing the bodies into granules, the order of said two last-mentioned steps being arbitrary.

7. A method as claimed in claim 6 in which the compacted bodies are subjected to a temperature of 450 to 600° C.

8. A method of making a granular flux which comprises mixing powdered flux ingredients with a compound selected from the group comprising uncombined boric oxide and boric acid, compacting the mixture and heating it to a temperature of 450–600° C., extruding the hot mass, and subdividing the resulting elongated bodies or strings into granules.

9. A method as claimed in claim 8 in which said elongated bodies are given a cross-sectional shape and size such that at least one transversal dimension (the thickness) is equal to the required grain size, whereby the subdivision of the elongated bodies into granules of uniform size is facilitated.

10. A method as claimed in claim 8 in which the elongated body while still hot and in a plastic state is hacked or cut into granules or provided with notches or incisions serving to facilitate subdivision of the bodies into granules of uniform size during or after cooling of said body.

References Cited

UNITED STATES PATENTS

| 2,442,892 | 6/1948 | Harvey | 148—26 |
| 3,185,599 | 5/1965 | Arnold et al. | 148—26 |

L. DEWAYNE RUTLEDGE, *Primary Examiner.*

W. W. STALLARD, *Assistant Examiner.*